United States Patent
Mori et al.

(10) Patent No.: US 8,311,019 B2
(45) Date of Patent: Nov. 13, 2012

(54) RADIO NETWORK CONTROLLER AND FRAME TRANSMISSION ADJUSTING METHOD

(75) Inventors: Midori Mori, Yokohama (JP); Koji Omae, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 353 days.

(21) Appl. No.: 12/667,328

(22) PCT Filed: Jul. 3, 2008

(86) PCT No.: PCT/JP2008/062063
§ 371 (c)(1),
(2), (4) Date: Dec. 30, 2009

(87) PCT Pub. No.: WO2009/005122
PCT Pub. Date: Jan. 8, 2009

(65) Prior Publication Data
US 2011/0002310 A1    Jan. 6, 2011

(30) Foreign Application Priority Data
Jul. 3, 2007 (JP) .................................. 2007-175222

(51) Int. Cl.
*H04J 3/00* (2006.01)
(52) U.S. Cl. ......... 370/336; 370/345; 370/329; 370/498
(58) Field of Classification Search .................. 370/76, 370/336, 352, 483, 493, 503; 455/426.1, 455/556.1
See application file for complete search history.

(56) References Cited

U.S. PATENT DOCUMENTS

| 2002/0105933 A1 | 8/2002 | Higuchi |
| 2003/0048810 A1* | 3/2003 | Kermade et al. ............... 370/503 |
| 2004/0017777 A1* | 1/2004 | Chaudhuri et al. ........... 370/241 |
| 2008/0095187 A1* | 4/2008 | Jung et al. ..................... 370/468 |

FOREIGN PATENT DOCUMENTS

| JP | 2001-358793 A | 12/2001 |
| JP | 2003-198446 A | 7/2003 |

(Continued)

OTHER PUBLICATIONS

"3GPP", 3rd Generation Partnership Project; Technical Specification Group Radio Access Network; Synchronisation in UTRAN Stage 2 (Release 1999), 3G TS 25.402, V3.2.0 (Jun. 2000), 37 pages.

(Continued)

*Primary Examiner* — Hassan Phillips
*Assistant Examiner* — Anez Ebrahim
(74) *Attorney, Agent, or Firm* — Crowell & Moring LLP

(57) ABSTRACT

In adjusting transmission timings of frames sequentially transmitted from a radio network controller to a base transceiver station, the frame transmission schedule is changed in appropriate manner in response to a necessary Timing Adjustment control frame (TA). In a first period of time, which is a period of ignoring the received TA, the adjustment of the transmission timings of the frames is suspended. Also, out of the first period, the first period is varied in accordance with a variety of the delayed amount in transmission between the radio network controller and the base transceiver station. There is provided a period of ignoring a first control frame to be informed from the radio base transceiver station to the radio network controller. By setting the period to be a variable value, the synchronization control is accomplished with certainty.

4 Claims, 15 Drawing Sheets

FOREIGN PATENT DOCUMENTS

| | | |
|---|---|---|
| JP | 2004-96559 A | 3/2004 |
| JP | 2005-269061 A | 9/2005 |

OTHER PUBLICATIONS

"3GPP", 3rd Generation Partnership Project; Technical Specification Group Radio Access Network; UTRAN lub/lur Interface User Plane Protocol for DCH Data Streams (3G TS 25.427 version 3.0.0) (Oct. 1999), 22 pages.

J. Postel, "Internet Control Message Protocol", Darpa Internet Program, Protocol Specification, Network Working Group, Request for Comments: 792, Sep. 1981, 21 pages.

PCT/JP2008/062063 PCT/ISA/210.

PCT/JP2008/062063, PCT/IB/338, 1 page.

PCT/JP2008/062063, PCT/IB/373, 1 page.

PCT/JP2008/062063, PCT/ISA/237 (Translation), 4 pages.

* cited by examiner

F I G. 1
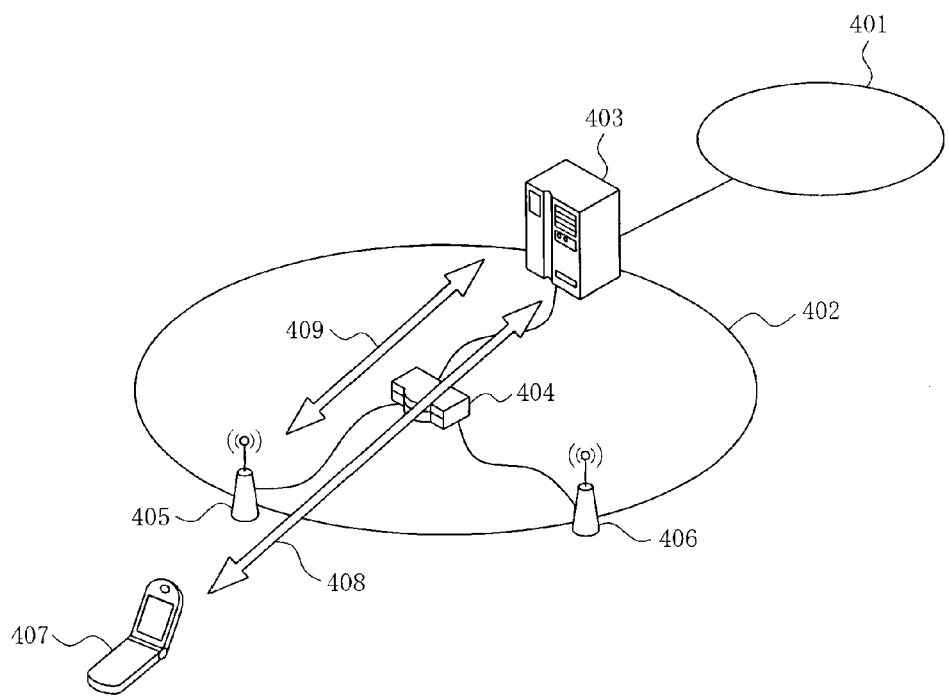

F I G. 3
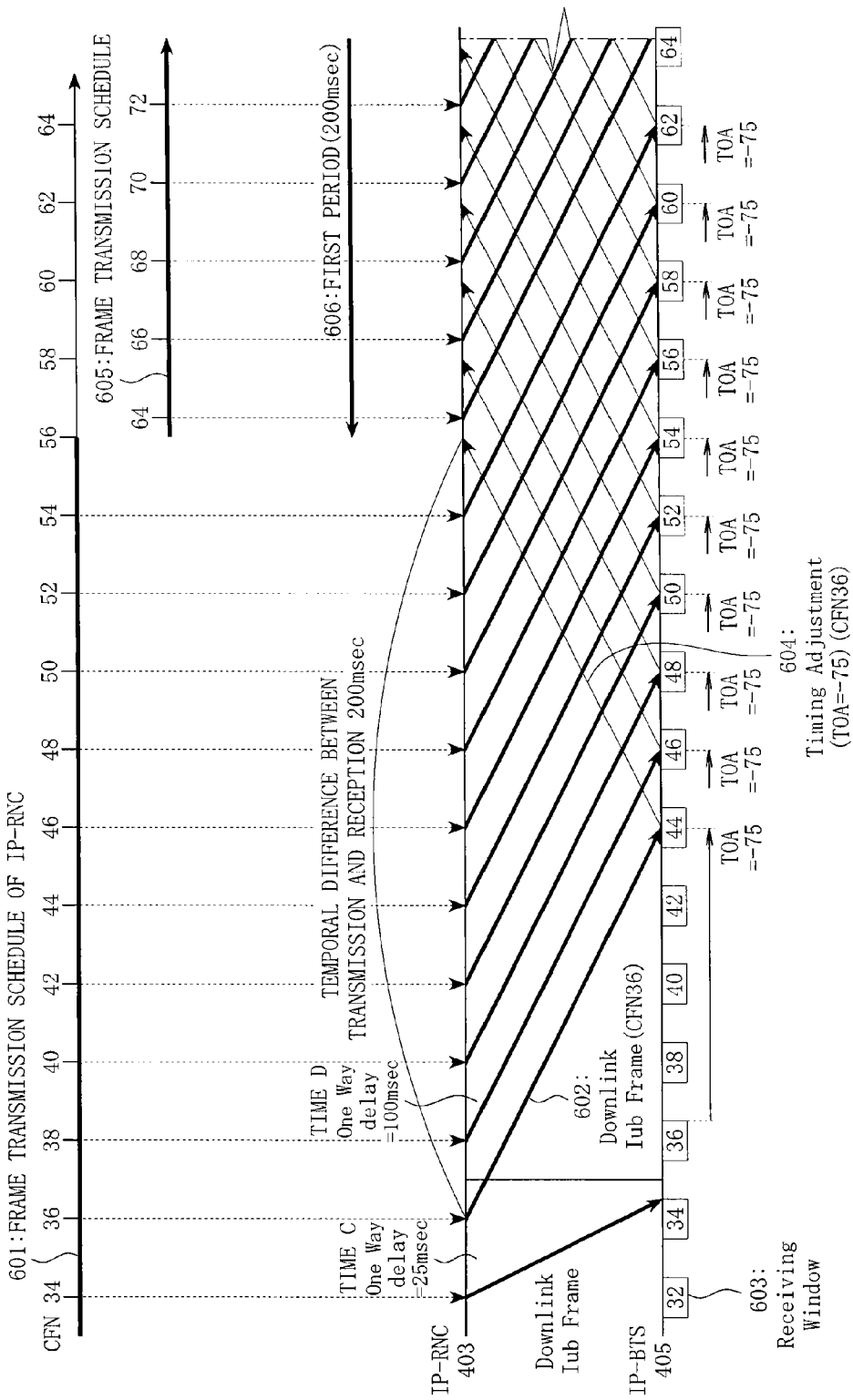

F I G. 4
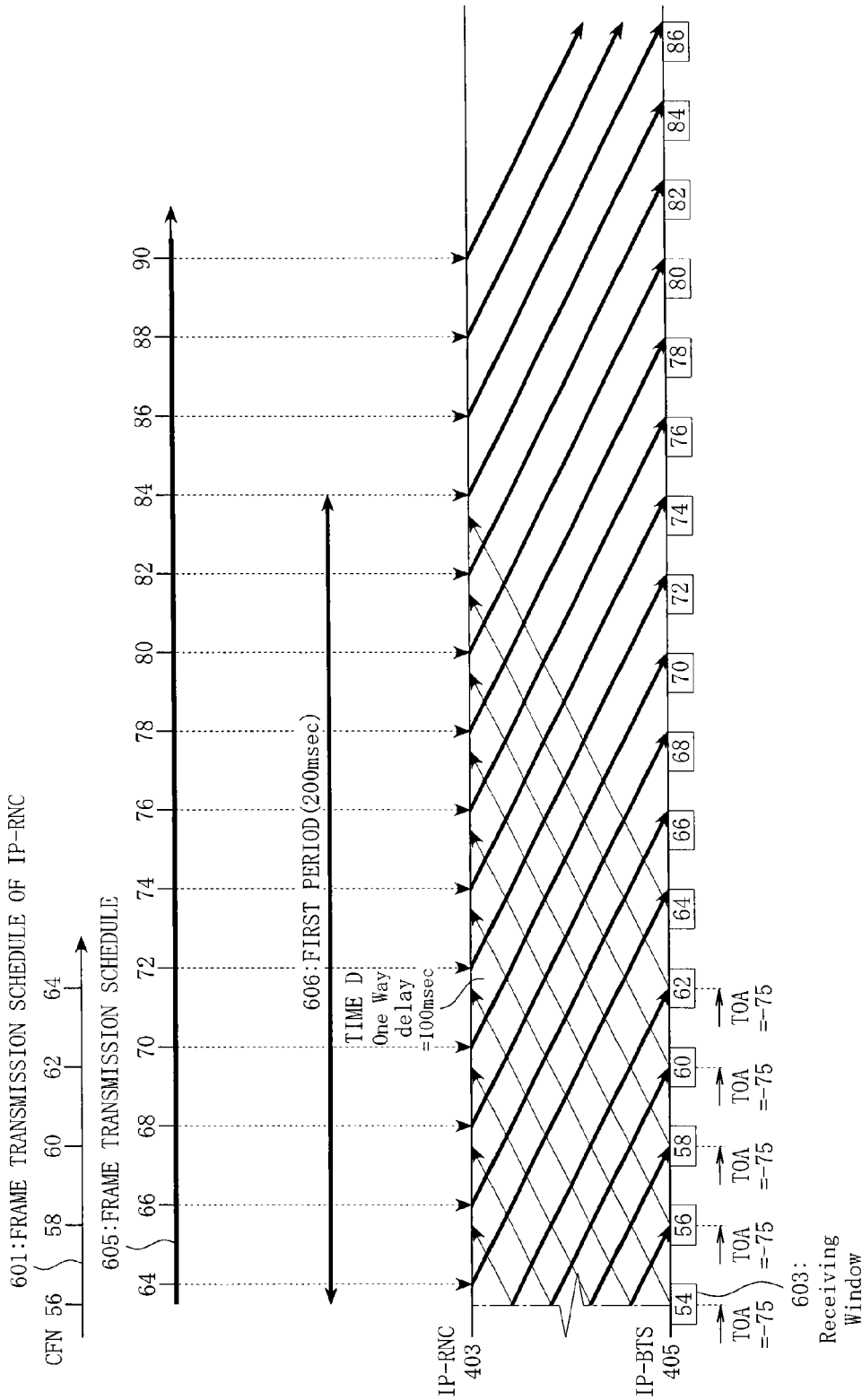

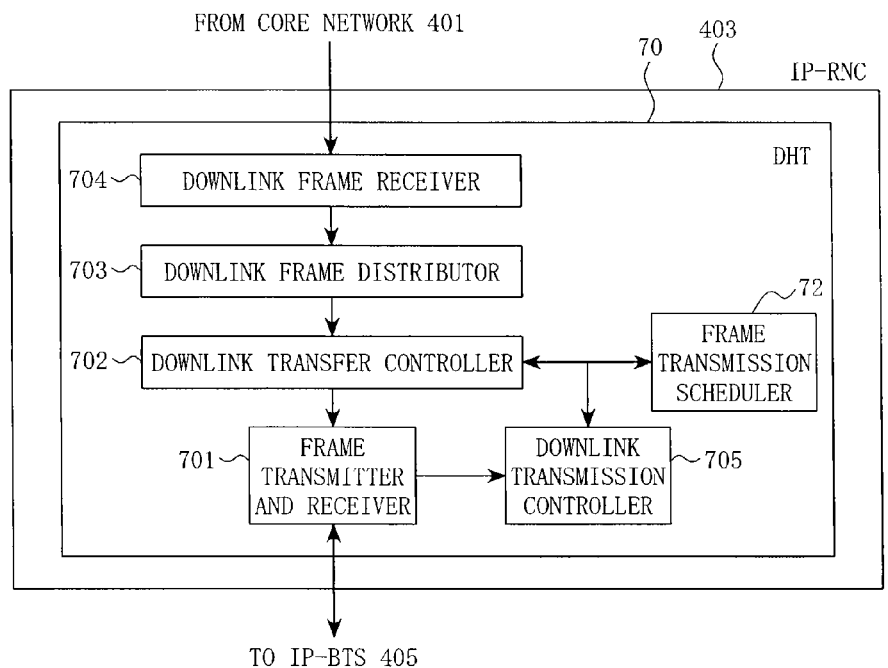

| | | EVENTS | |
|---|---|---|---|
| | | RECEPTION OF TA(TOA=a, CFN=n) | FIRST PERIOD ELAPSES |
| STATES | TA RECEIVABLE STATE | INSTRUCT THE FRAME TRANSMISSION SCHEDULER 72 TO DELAY THE FRAME TRANSMISSION SCHEDULE BY A PERIOD OF "a" ONLY. START MEASURING THE FIRST PERIOD (THE "FIRST PERIOD" IS SET TO BE THE DIFFERENCE BETWEEN THE TA RECEPTION TIME AND THE TIME WHEN A DOWNLINK FRAME APPLIED WITH CFN "n" IS RECEIVED IN THE CURRENT FRAME TRANSMISSION SCHEDULE) ⇒SHIFT TO TA NON-RECEIVABLE STATE | N/A |
| | TA NON-RECEIVABLE STATE | NO OPERATION | ⇒SHIFT (TO TA RECEIVABLE STATE) |

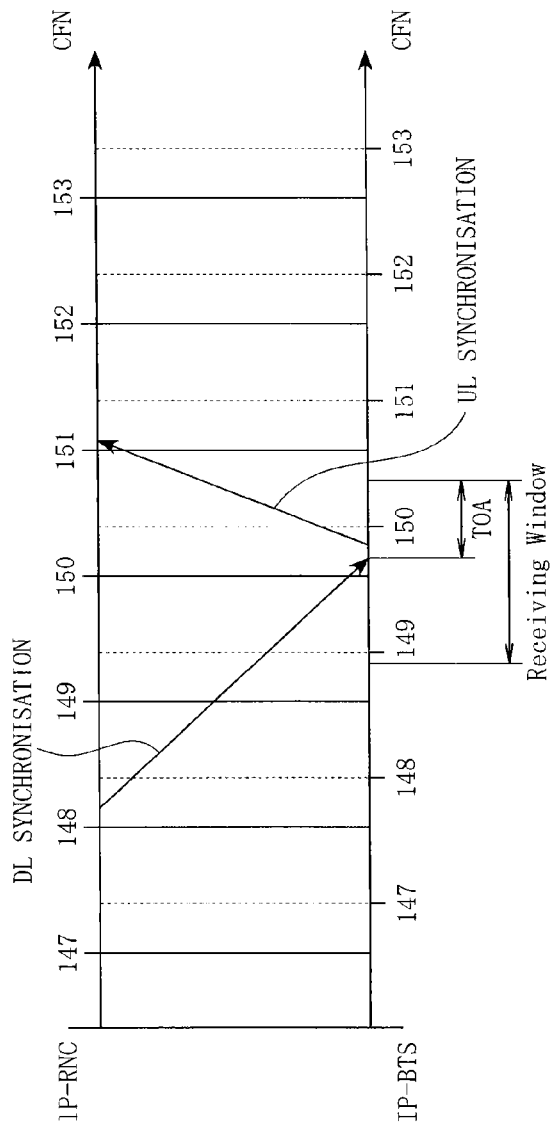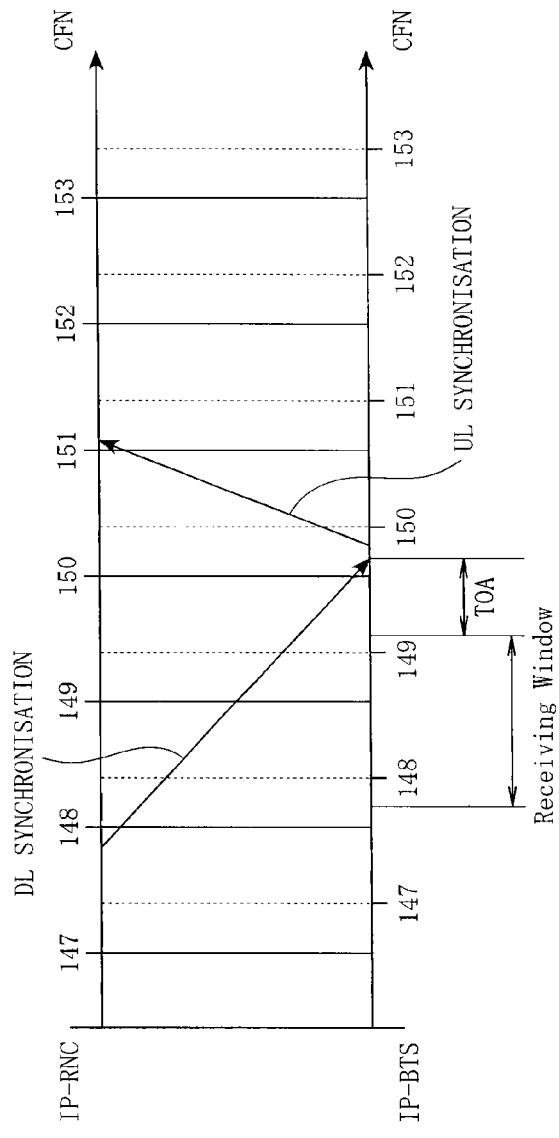

PRIOR ART

PRIOR ART

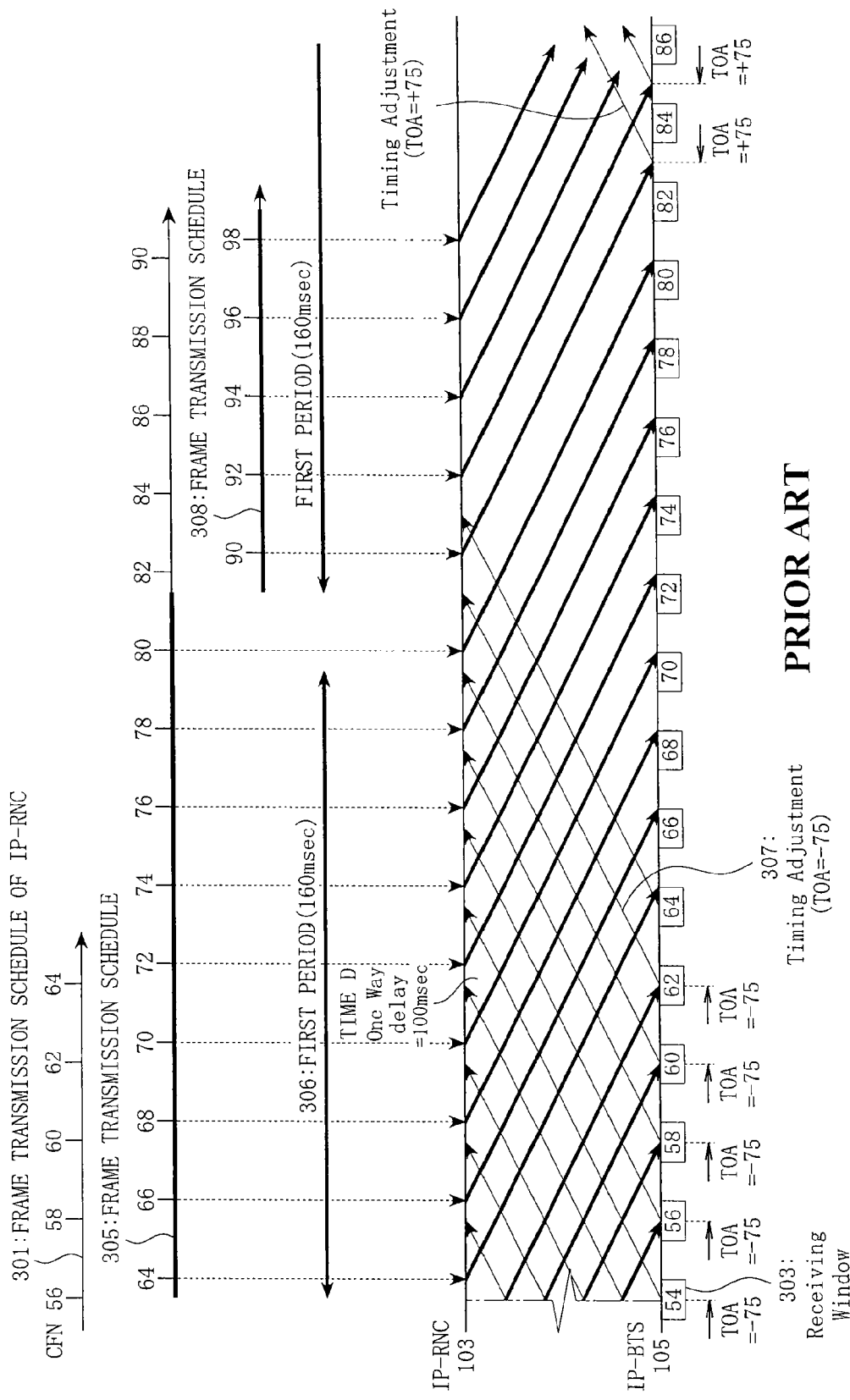

RADIO NETWORK CONTROLLER AND FRAME TRANSMISSION ADJUSTING METHOD

TECHNICAL FIELD

The present invention relates to radio network controllers and frame transmission timing adjusting methods, and in particular, relates to a synchronisation control between a radio network controller and a base transceiver station in a mobile communication system by use of IMT (International Mobile Telecommunications) 2000 system.

BACKGROUND ART

FIG. 14 is a view showing a configuration of a radio access network (hereinafter, referred to as IP-RAN) 102 on the basis of IP technology of a mobile communication system with the use of the IMT 2000 system.

In FIG. 14, the IP-RAN 102 includes: a radio network controller (hereinafter, referred to as IP-RNC) 103 connected to a core network 101; a router 104; and base transceiver stations (hereinafter, referred to as IP-BTS) 105 and 106 connected to the router 104. The IP-RAN 102 is a network that provides a terminal 107 with mobile communication.

A Connection Frame Number (hereinafter, referred to as CFN), which is a frame sequence number that increases its value as the time advances as specified in 3GPP TS 25.427, is applied to a data frame transmitted and received between the IP-RNC 103 and the IP-BTS 105. Synchronisation control specified in 3GPP TS 25.402 is performed for the data frame. The synchronisation control is performed as follows. When a reception timing of a frame is out of a Receiving Window that is a temporal receiving range, the period out of the window is informed to the transmitting side by use of a Timing Adjustment control frame. The synchronisation control is performed by receiving the frame and then adjusting the transmission timing of the frame so that the reception timing of the frame falls within the Receiving Window (which means that the transmission schedule is changed).

This data frame is, as shown in FIG. 15, has a header part of 2 bytes and a payload part of a variable length. The header part is composed of Frame CRC, FT (Frame Type), and Control Frame Type.

The payload part of a variable length, when it is used for a Timing Adjustment control frame, is composed of a CFN of 1 octet, a TOA (Time Of Arrival) of 2 octets, and Spare Extension part of 0 to 32 octets.

Referring back to FIG. 14, if the round-trip transmission delay between the IP-RNC 103 and the IP-BTS 105 is constant, the reception timing of the frame should fall within a Receiving Window by adjusting the transmission timing. However, since the round-trip transmission delay between the IP-RNC 103 and the IP-BTS 105 varies according to the congestion level of the IP-RAN from moment to moment, it is necessary to change the transmission schedule. In the following, a description will be given of changing of the transmission schedule of Iub data frames in a case where the round-trip transmission delay varies.

For example, regarding a connection call 108 from the terminal 107, after Transport Channel Synchronisation is completed at a synchronisation control 109 between the IP-RNC 103 and the IP-BTS 105, the round-trip transmission delay between the IP-RNC and IP-BTS is assumed to vary as listed below.

Time A (0.00 to 1.00 seconds): 10 msec (one way: 5 msec)
Time B (1.00 to 1.05 seconds): 30 msec (one way: 15 msec)
Time C (1.05 to 2.00 seconds): 50 msec (one way: 25 msec)
Time D (2.00 seconds and later): 200 msec (one way: 100 msec)

FIG. 17 is a view showing transmission and reception of Iub data frames from the IP-RNC 103 to the IP-BTS 105 from Time A, through Time B, to Time C. In the drawing, downlink Iub data frames 202 are sequentially transmitted from the IP-RNC 103 in accordance with the frame transmission schedule. The frame transmission schedule is assumed to be sequentially shifted in the order of a schedule 201, a schedule 206, and a schedule 210.

In addition, a Receiving Window 203 is set at the IP-BTS 105. Sequential numbers are applied to the Receiving Windows, respectively. In the present example, the Receiving Windows applied with even numbers are employed.

Herein, it is assumed that a fixed value of "160 msec" is set to be a period 207. The period starts immediately after the transmission timing is adjusted, as a period in which the received Timing Adjustment control frame is ignored. Hereinafter, each of the operations in Time A, time B, and Time C will be described.

(Operation in Time A)

After the Transport Channel Synchronisation is completed, the IP-RNC 103 transmits Iub data frames applied with CFNs, in accordance with the frame transmission schedule 201.

For instance, the downlink Iub data frame 202 (applied with the CFN "120") that is transmitted on the frame transmission schedule 201 is received in the Receiving Window 203 of the corresponding CFN of the IP-BTS 105.

(Operation in Time B)

Then, in Time B, the round-trip transmission delay between the IP-RNC 103 and the IP-BTS 105 varies, and then the synchronisation established by the Transport Channel Synchronization is lost. Specifically, a downlink Iub data frame 204 transmitted in accordance with the frame transmission schedule 201 arrives at the IP-BTS 105 with "10 msec" delayed than before. The IP-BTS 105 informs the IP-RNC 103 of the delay of "10 msec" (that is, TOA=−10) by use of a Timing Adjustment control frame (hereinafter, referred to as TA) 205. Specifically, a TOA of a positive value is informed in a case where the IP-BTS 105 receives earlier than a reception timing expected by the IP-BTS 105, whereas a TOA of a negative value is informed in a case where the IP-BTS 105 receives later than that.

Incidentally, TA is specified in Chapter 7.2 in 3GPP TS 25.402. In other words, as shown in FIG. 18, a DL DATA frame transmitted from the IP-RNC to the IP-BTS is received at a timing out of the Receiving Window. Then, the IP-BTS transmits, to the IP-RNC, a TA including a TOA indicative of a period being out of the Receiving Window.

Referring back to FIG. 17, the IP-RNC 103 moves the transmission schedule forward by 10 msec as indicated by the TA 205, and changes the frame transmission schedule to the transmission schedule 206. At this point of time (that is, when the TA 205 is received), the first period 207 starts. While the first period 207 is continuing (that is, for 160 msec), the frame transmission schedule is not changed even if other TAs are received. In other words, any received TA is ignored, while the first period 207 is continuing.

(Operation in Time C)

In Time C, the round-trip transmission delay varies again, so the IP-BTS 105 informs that no downlink Iub data frame has been received in a Receiving Window, by use of four TAs 208. However, the afore-mentioned four TAs 208 arrive at the IP-RNC 103 in the first period 207. Accordingly, these TAs are ignored and the frame transmission schedule of the IP-RNC 103 will not be changed.

Subsequently, the first period 207 elapses, and the reception of a TA 209 permits the IP-RNC 103 to change the frame transmission schedule to the frame transmission schedule 210.

In this situation, the conventional system has a drawback in that the first period 207 hinders reacting to the four TAs 208 and delays the recovery of synchronisation.

(Operation in Time D)

Meanwhile, FIG. 19 and FIG. 20 are views showing transmission and reception of the Iub data frames between the IP-RNC 103 and the IP-BTS 105 in Time C to Time D.

In Time C, a downlink Iub data frame transmission schedule 301 establishes the synchronisation between the IP-RNC and the IP-BTS.

Turning to Time D, as the downlink one-way transmission delay increases from "25 msec" to "100 msec", a downlink Iub data frame 302 applied with CFN of 36 arrives at the IP-BTS 105 "75 msec" later than a Receiving Window 303 for the frame applied with CFN of 36. Upon reception of this, the IP-BTS 105 informs the IP-RNC 103 of this "75 msec" delay, as TOA=−75, by use of a TA 304.

The IP-RNC 103 receives the TA 304 and changes the frame transmission schedule 301 to a frame transmission schedule 305, and simultaneously starts a first period 306. Since then, the transmission delay between the IP-RNC and the IP-BTS does not change, so the frame transmission schedule 305 does not have to be changed any more.

In fact, the IP-RNC 103, however, after the first period 306 elapses, changes the frame transmission schedule to a frame transmission schedule 308 upon reception of a TA 307. This is an unnecessary change of the frame transmission schedule.

A drawback in the conventional system is that such an insufficient time length of the first period 306 changes the frame transmission schedule in response to the TA 307 that should be ignored, thereby making it impossible to perform the synchronisation control between the IP-PNC and the IP-BTS correctly.

Incidentally, JP 2005-269061 A (hereinafter, referred to as Document 1) discloses that the information about a synchronisation timing error is communicated from the receiving side to the transmitting side, so as to adjust the transmission timing based upon the information.

DISCLOSURE OF THE INVENTION

Problem to be Solved by the Invention

As described heretofore, unless the first period is set in an appropriate manner, there will be a drawback in that changing of the frame transmission schedule will be delayed with a necessary TA ignored, or the frame transmission schedule will be changed in response to a TA that should be ignored. The technique described in Document 1 does not address such a drawback.

The present invention has been made to solve the drawbacks of conventional techniques, and it is an object of the present invention to provide a radio network controller and a frame transmission timing adjusting method, whereby the frame transmission schedule is changeable in an appropriate manner in response to a necessary TA for synchronisation control.

Means for Solving the Problem

According to an aspect of the present invention, there is provided a radio network controller that adjusts transmission timings of frames to be sequentially transmitted to a base transceiver station, after receiving from the base transceiver station a first control frame for informing of a difference between a reception timing of a frame and an expected reception timing thereof by the base transceiver station, when the frame applied with a frame sequence number is received out of a receiving window by the base transceiver station provided with the receiving windows that are temporal receivable ranges arranged at even intervals and that are applied with the frame sequence numbers, respectively, that increase their values as the time advances, the radio network controller comprising: control means for controlling adjustment of the transmission timing of the frame to be suspended in a first period that begins immediately after the transmission timing is adjusted, as a period of ignoring a first control frame that has been received; and means for changing the first period in accordance with a change in a transmission delay between the radio network controller and the base transceiver station.

With such a configuration, there is provided a period of time in which the first control frame to be informed from the radio network controller to the radio base transceiver station is ignored. The synchronisation control is accomplished with certainty by setting the period of time to be a variable value.

In the above configuration, the first period is set to a period in which a period of $\alpha$, which is a value greater than 0 and smaller than a transmission interval of the frames, is added to a round-trip transmission delay between the radio network controller and the base transceiver station.

With such a configuration, the first period is varied in accordance with the round-trip transmission delay of the frame, thereby accomplishing the synchronisation control with certainty.

In the above configuration, the round-trip transmission delay of the frame is set in accordance with a temporal difference between a transmission time when the radio network controller transmits a data frame and a reception time, of the first control frame that has been transmitted, when the base transceiver station receives the data frame out of the receiving window.

With such a configuration, the temporal difference between the transmission time and the reception time of a frame is employed, thereby making it easy to measure the round-trip transmission delay of the frame.

In the above configuration, the round-trip transmission delay of the frame is set based upon a period from a time when any one of the radio network controller and the base transceiver station transmits an ICMP ECHO request to a time when said any one of the radio network controller and the base transceiver station receives a response of the request.

With such a configuration, the use of the ICMP ECHO allows the round-trip transmission delay to be measured with ease.

In the above configuration, the round-trip transmission delay of the frame is set based upon a temporal difference between a transmission time of a DL Synchronisation frame and a reception time of a UL Synchronisation frame, the DL Synchronisation frame and the UL Synchronisation frame being transmitted and received between the radio network controller and the base transceiver station, in Transport Channel Synchronisation specified in 3GPP TS 25.402.

With such a configuration, the DL Synchronisation frame and the UL Synchronisation frame are utilized, thereby making it easy to measure the round-trip transmission delay of the frame.

According to another aspect of the present invention, there is provided a frame transmission timing adjusting method of adjusting transmission timings of frames to be sequentially transmitted from a radio network controller to a base transceiver station, after receiving from the base transceiver station a first control frame for informing of a difference between a reception timing of a frame and an expected reception timing thereof by the base transceiver station, when the frame applied with a frame sequence number is received out of a receiving window by the base transceiver station provided with the receiving windows that are temporal receivable ranges arranged at equal intervals and that are applied with the frame sequence numbers, respectively, that increase their values as the time advances, the frame transmission timing adjusting method comprising: controlling adjustment of the transmission timing of the frame to be suspended in a first period that begins immediately after the transmission timing is adjusted, as a period of ignoring a first control frame that has been received; and changing of the first period in accordance with a change in a transmission delay between the radio network controller and the base transceiver station.

With such a configuration, there is provided a period of ignoring any information of informing of the amount of period in which the synchronisation between the radio network controller and the radio base transceiver station is lost. Also, the period is set to be a variable value, thereby accomplishing the synchronisation control with certainty.

To be brief, in order to adjust the first period at an appropriate time length to correspond to the round-trip transmission delay between the radio network controller and the base transceiver station, the radio network device controller measures the round-trip transmission delay between the radio network controller and the base transceiver station, so as to set it to be the first period.

Effects of the Invention

According to the present invention, there is provided a period of ignoring a first control frame to be informed from the radio base transceiver station to the radio network controller. By setting the period to be a variable value, it is possible to accomplish the synchronisation control with certainty.

BRIEF DESCRIPTION OF THE DRAWINGS

FIG. 3 is a view illustrative of transmission and reception of the Iub data frames from the IP-RNC to the IP-BTS in FIG. 1;

FIG. 4 is a view illustrative of transmission and reception of the Iub data frames from the IP-RNC to the IP-BTS in FIG. 1;

FIG. 5 is a block diagram illustrative of a configuration example of the IP-RNC in FIG. 1;

FIG. 6 is a view illustrative of a state of a downlink transmission controller in FIG. 1;

FIG. 12A is a view illustrative of the operation of a case where a reception timing of a DL Synchronisation frame falls within a Receiving Window, and FIG. 12B is a view illustrative of the operation of a case where the reception timing of the DL Synchronisation frame is out of the Receiving Window;

FIG. 19 is a view showing transmission and reception of the Iub data frames from the IP-RNC to the IP-BTS in FIG. 14; and FIG. 20 is a view showing transmission and reception of the Iub data frames from the IP-RNC to the IP-BTS in FIG. 14.

Figure 2:
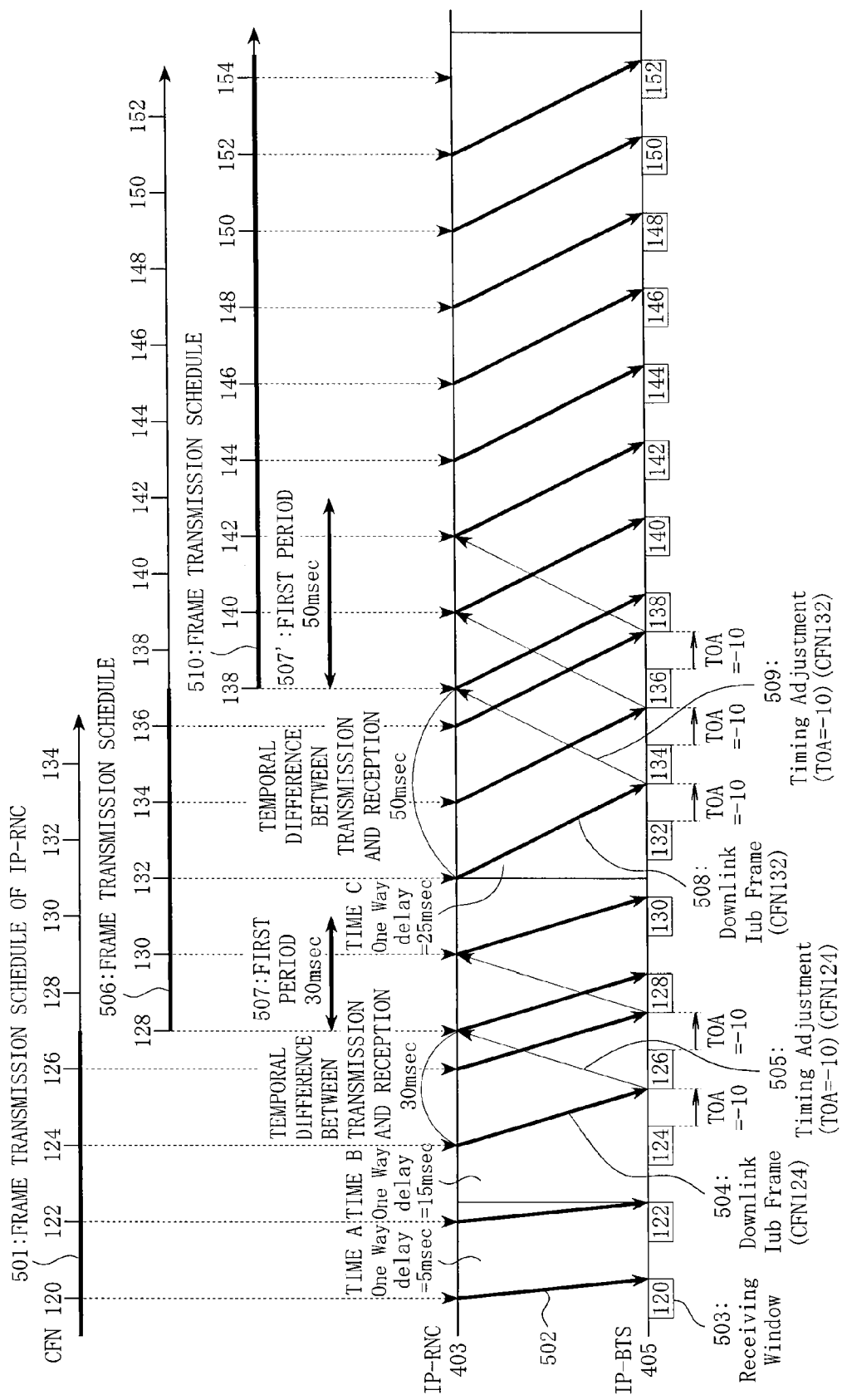
FIG. 2 is a view illustrative of transmission and reception of Iub data frames from an IP-RNC to an IP-BTS in FIG. 1.

EXPLANATION OF REFERENCES 70 diversity handover trunk
72 frame transmission scheduler
101, 401 core network
102, 402 radio access network
103, 403 radio network controller
104, 404 router
105, 106, 405, 406 base transceiver station
107, 407 terminal
701 frame transmitter and receiver
702 downlink transfer controller
703 downlink frame distributor
704 downlink frame receiver
705 downlink transmission controller
706 ICMP ECHO request transmitter
707 memory
708 calculation program

BEST MODE FOR CARRYING OUT THE INVENTION

Embodiments of the present invention will now be described with reference to the drawings. In each of the drawings to be referred to in the following description, the same components and configurations have the same reference numerals.

(Embodiments)

Figure 1:
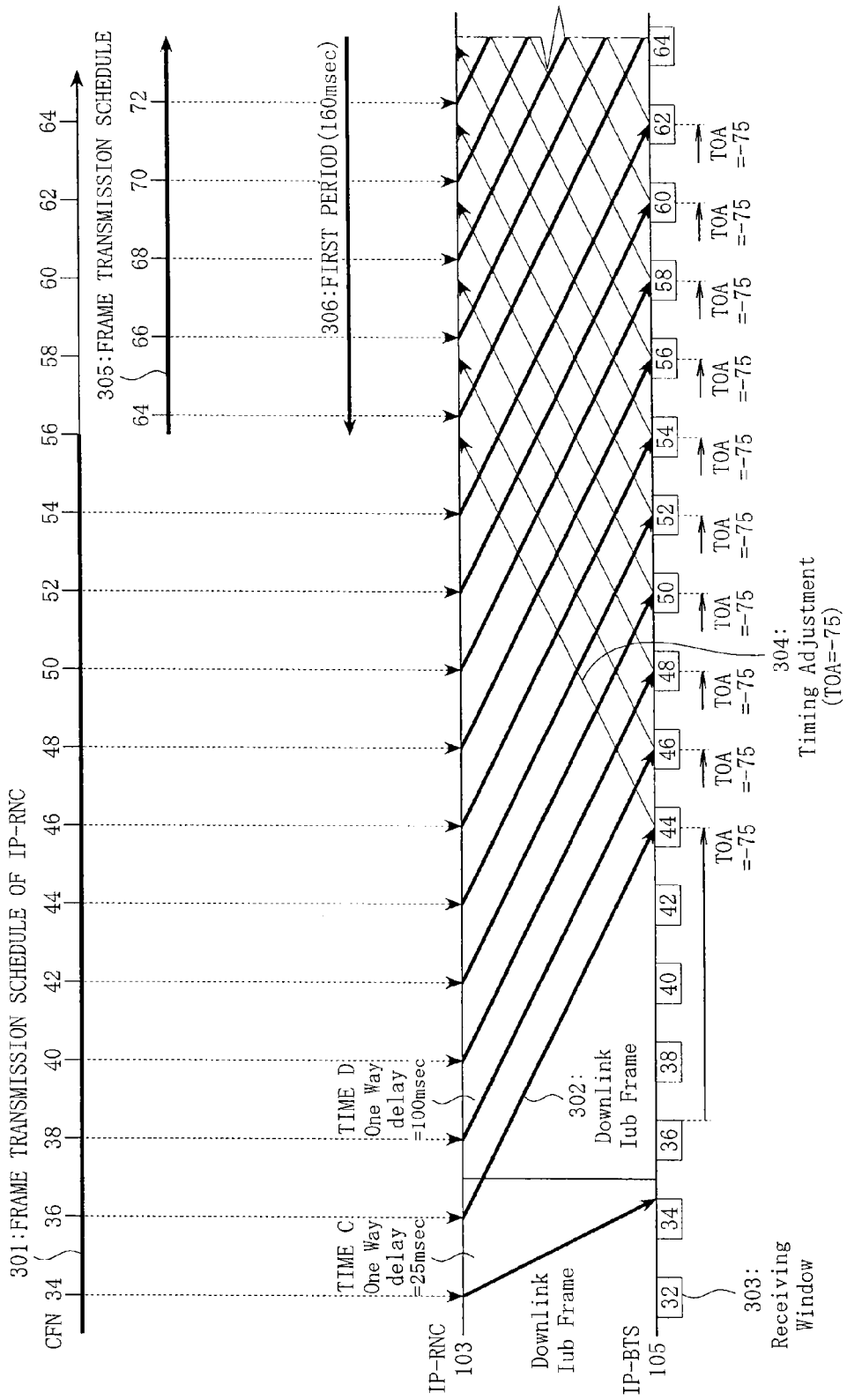
FIG. 1 is a block diagram illustrative of a configuration example of a mobile communication system including a radio network controller according to an aspect of the present invention.

FIG. 1 is a block diagram illustrative of a configuration example of a mobile communication system including a radio network controller according to an aspect of the present invention. FIG. 1 illustrates a configuration of an IP-RAN 402 in a mobile communication system by use of the IMT 2000 system.

The IP-RAN 402 includes: an IP-RNC 403 connected to the core network 101; a router 404; and IP-BTSs 405 and 406 connected to the router 404. The IP-RAN 402 is a network that provides a terminal 407 with mobile communication.

A CFN, as specified in 3GPP TS 25.427, is applied to a frame transmitted and received between the IP-RNC 403 and the IP-BTS 405. Synchronisation control specified in 3GPP TS 25.402 is performed for the frame. The synchronisation control is performed as follows. When a reception timing of a frame is out of a Receiving Window, the period out of window is informed to the transmitting side by use of a Timing Adjustment control frame. The synchronisation control is performed by receiving the frame and then adjusting the transmission timing of the frame so that the reception timing of the frame falls within the Receiving Window (which means that the transmission schedule is changed).

If the round-trip transmission delay between the IP-RNC 403 and the IP-BTS 405 is constant, the reception timing of the frame should fall within a Receiving Window by adjusting the transmission timing. However, since the round-trip transmission delay between the IP-RNC 403 and the IP-BTS 405 varies according to the congestion level of the IP-RAN from moment to moment, it is necessary to change the transmission schedule. In the following, a description will be given of changing of the transmission schedule of Iub data frames in a case where the round-trip transmission delay varies.

For example, regarding a call connection 408 from the terminal 407, after Transport Channel Synchronisation is completed at a synchronisation control 409 between the IP-RNC 403 and the IP-BTS 405, the round-trip transmission delay between the IP-RNC and IP-BTS is assumed to vary as listed below.

Time A (0.00 to 1.00 seconds): 10 msec (one way: 5 msec)
Time B (1.00 to 1.05 seconds): 30 msec (one way: 15 msec)
Time C (1.05 to 2.00 seconds): 50 msec (one way: 25 msec)
Time D (2.00 seconds and later): 200 msec (one way: 100 msec)

FIG. 2 is a view illustrative of transmission and reception of Iub data frames from the IP-RNC 403 to the IP-BTS 405 from Time A, through Time B, to Time C. In the drawing, downlink Iub data frames 502 are sequentially transmitted from the IP-RNC 403 in accordance with the frame transmission schedule. The frame transmission schedule is assumed to be sequentially shifted in the order of a schedule 501, a schedule 506, and a schedule 510.

In addition, a Receiving Window 503 is set at the IP-BTS 405. Sequential numbers are applied to the Receiving Windows, respectively. In the present example, the Receiving Windows applied with even numbers are employed.

In the present example, a variable value is set for a first period 507, instead of a fixed value, so as to set its value in an appropriate manner. Hereinafter, each of the operations in Time A, time B, and Time C will be described.
(Operation in Time A)

After the Transport Channel Synchronization is completed, the IP-RNC 403 transmits Iub data frames applied with CFNs, in accordance with the frame transmission schedule 501.

For instance, the downlink Iub data frame 502 (applied with the CFN "120") that is transmitted on the frame transmission schedule 501 is received in the Receiving Window 503 with the corresponding CFN of the IP-BTS.
(Operation in Time B)

Then, in Time B, the round-trip transmission delay between the IP-RNC 403 and the IP-BTS 405 varies, the synchronisation established in the Transport Channel Synchronisation is lost. Specifically, a downlink Iub data frame 504 (applied with a CFN "124") transmitted in accordance with the frame transmission schedule 501 arrives at the IP-BTS 405 with "10 msec" delayed than before. The IP-BTS 405 informs the IP-RNC 403 of the delay of "10 msec" (that is, TOA=−10) by use of a TA 505 (applied with the CFN "124").

The IP-RNC 403 moves the transmission schedule forward by "10 msec" as indicated by the TA 505 (applied with the CFN "124"), and changes the frame transmission schedule to the transmission schedule 506.

At this point of time, the IP-RNC 403 calculates the difference between the reception time of the TA 505 (applied with the CFN "124") and the transmission time of the downlink Iub data frame 504 (applied with the CFN "124"). Then, the IP-RNC 403 sets the calculation result (in this case, "30 msec") to be a continued period of the first period 507, and then starts the first period 507. While the first period 507 is continuing (that is, for "30 msec"), the frame transmission schedule is not changed even if another TA is received. In other words, any received TA is ignored, while the first period 507 is continuing.
(Operation in Time C)

In Time C, the transmission delay varies again, the IP-BTS 405 informs that a downlink Iub data frame 508 (applied with a CFN "132") has not been received in a Receiving Window, with the use of a TA 509 (applied with a CFN "132"). The IP-RNC 403 receives it, and is then capable of changing the frame transmission schedule to the frame transmission schedule 510. In this situation, the IP-RNC 403 sets the "50 msec" informed by the TA 509 to be a continued period of a first period 507', and then starts the first period 507'.

Figure 17:
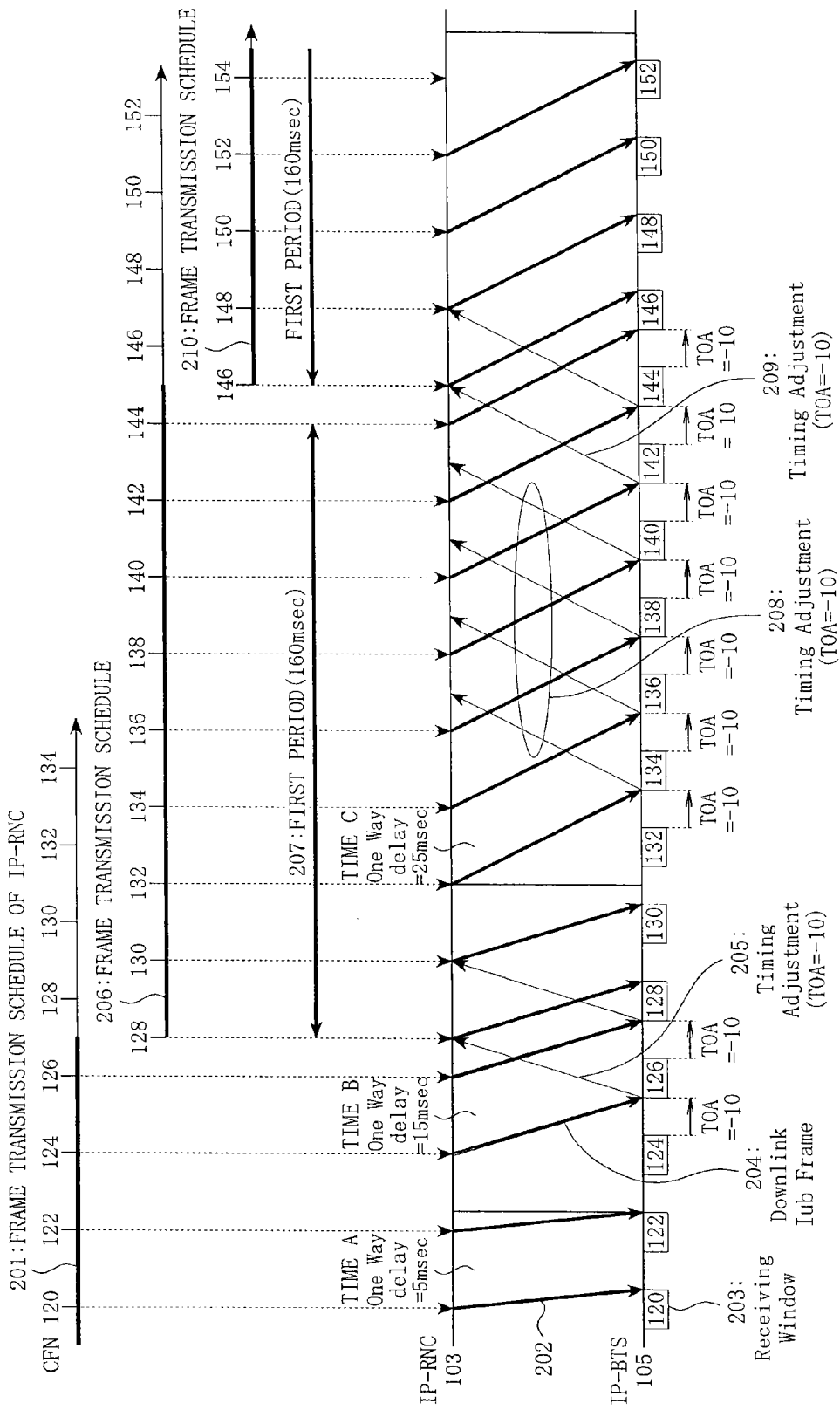
FIG. 17 is a view showing transmission and reception of Iub data frames from an IP-RNC to an IP-BTS in FIG. 14.
Figure 18:
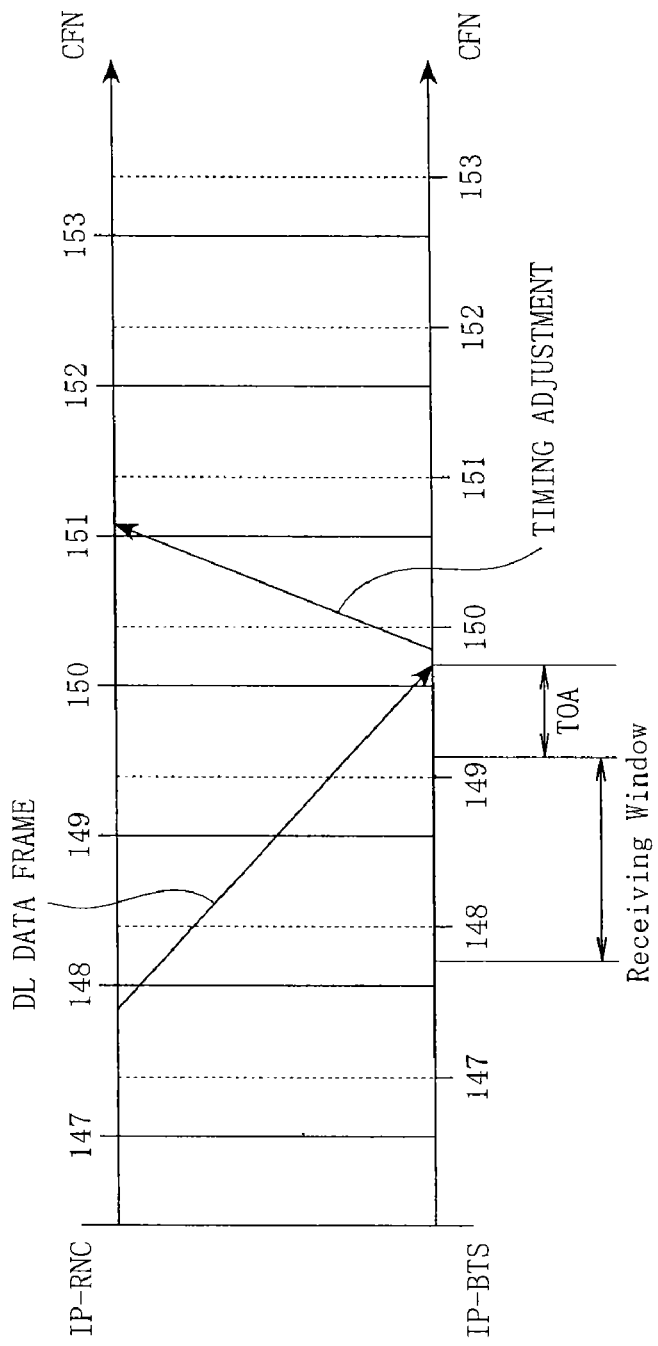
FIG. 18 is a view showing transmission and reception of the Iub data frames from the IP-RNC to the IP-BTS in FIG. 14.

In the above process, when the present example (FIG. 2) is compared with the conventional case of FIG. 17, the recovery in the synchronisation is faster in the present example. This is because the first period 507 in the present example is shorter than the conventional case and the reaction to a TA is quicker.
(Operation in Time D)

Meanwhile, FIG. 3 and FIG. 4 are views illustrative of transmission and reception of the Iub data frames between the IP-RNC 403 and the IP-BTS 405 in Time C to Time D.

In Time C, synchronisation is established between the IP-RNC 403 and the IP-BTS 405, in a downlink data frame transmission schedule 601.

Turning to Time D, the downlink one-way transmission delay increases from "25 msec" to "100 msec". For this reason, a downlink Iub data frame 602 applied with a CFN 36 arrives at the IP-BTS 405 "75 msec" later than a Receiving Window 603 for the CFN 36. Upon reception of this, the IP-BTS 405 informs the IP-RNC 403 of this "75 msec" delay, as a TOA=−75, by use of a TA 604 (applied with a CFN "36").

The IP-RNC 403 receives the TA 604 and changes the frame transmission schedule 601 to a frame transmission schedule 605. Simultaneously, the IP-RNC 403 calculates the difference between the reception time of the TA 604 (applied with the CFN "36") and the transmission time of the downlink Iub data frame 602 (applied with the CFN "36"). Then, the IP-RNC 403 sets the calculation result (in this case, "200 msec") to be a continued period of a first period 606, and then starts the first period 606.

After that, since all TAs that arrive at the IP-RNC 403 arrive within the first period 606, the frame transmission schedule will no longer be changed.

In this situation, when the present example (FIG. 3 and FIG. 4) is compared with the conventional case of FIG. 19 and FIG. 20, an unnecessary change of the frame transmission schedule does not occur in the present example. The drawback of the conventional case results from the insufficient time length of the first period. However, the first period is sufficiently retained in the present example, thereby preventing an unnecessary change of the schedule.

(Configuration of IP-RNC)

FIG. 5 is a block diagram illustrative of a configuration example of the IP-RNC 403 in FIG. 1. In FIG. 5, the IP-RNC 403 is configured to include a diversity handover trunk (DHT) 70 that is responsible for controlling the transmission and reception of the frames with the IP-BTS 405. Herein, no functional block related to combination or transfer of uplink frames (from the IP-BTS 405 to the IP-RNC 403) is illustrated.

The diversity handover trunk 70 includes: a frame transmitter and receiver 701 that transmits and receives frames to and from the IP-BTS 405; a downlink transfer controller 702 that performs transfer control for downlink frames; a downlink frame distributor 703 that distributes the downlink frames; a downlink frame receiver 704 that receives the downlink frames from the core network 401; a downlink transmission controller 705 that controls transmission timings of the downlink frames; and a frame transmission scheduler 72 that controls frame transmission schedules.

In such a configuration, the downlink frame receiver 704 receives the downlink frames from the core network 401 and passes the frames to the frame distributor 703.

The frame distributor 703 distributes the frames as many as the number of branches, as necessary, and passes the frames to the downlink transfer controller 702.

The downlink transfer controller 702 passes the downlink Iub data frame to the frame transmitter and receiver 701 at an appropriate timing, in accordance with an instruction from the frame transmission scheduler 72.

The frame transmitter and receiver 701 transmits the Iub data frame to the IP-BTS 405. Also, the frame transmitter and receiver 701 that has received a TA from the IP-BTS 405 passes the TA to the downlink transmission controller 705.

Herein, the downlink transmission controller 705 has two states, as illustrated in FIG. 6. Referring to FIG. 6, when receiving a TA (where TOA=a, and CFN is "n") in a TA receivable state, the downlink transmission controller 705 instructs the frame transmission scheduler 72 to delay the frame transmission schedule by a period of "a" only. Then, the first period starts to be measured. In this situation, the "first period" is set to be a period of time in which a slight period of time α is added to the difference between the TA reception time and the time when a downlink frame applied with CFN "n" is received in the current frame transmission schedule. The afore-mentioned period of time α is to be a value greater than zero and smaller than a transmission interval to the next frame. Setting of the first period shifts the downlink transmission controller 705 to a TA non-receivable state.

Meanwhile, in the TA non-receivable state, when receiving a TA, the downlink transmission controller 705 ignores it and does not perform anything. Additionally, when the first period elapses, the downlink transmission controller 705 is shifted to the TA receivable state.

As described above, there are cases where the TA is ignored and the frame transmission schedule is changed based upon the TA that has been received, in accordance with the state of the downlink transmission controller 705.

Referring back to FIG. 5, the frame transmission scheduler 72 informs the downlink transfer controller 702 of the transmission schedule of downlink frames. Also, the frame transmission scheduler 72 changes the frame transmission schedule in accordance with a transmission timing change instruction from the downlink transmission controller 705. As the downlink transfer controller 702 transmits the downlink frames in accordance with the frame transmission schedule of the frame transmission scheduler 72, the downlink frames are to be transmitted in accordance with the frame transmission schedule that has been changed, since then.

(Measurement of Round-Trip Transmission Period)

When the first period is set, a slight period of time α should be added to a downlink delay target value and an uplink delay target value, at the time of system design. The afore-mentioned period of time α is set by considering a given process period taken from the time when the frame is received to the time when the frame is transmitted by the base transceiver station. In this process, the round-trip transmission delay between the radio network controller and the base transceiver station varies. Therefore, in order to set the first period in an appropriate manner, it is necessary to measure or calculate the round-trip transmission delay between the radio network controller and the base transceiver station. Hereinafter, a measuring method and a calculating method of the round-trip transmission delay will be described.

(Measurement by Use of ICMP ECHO)

Figure 7:
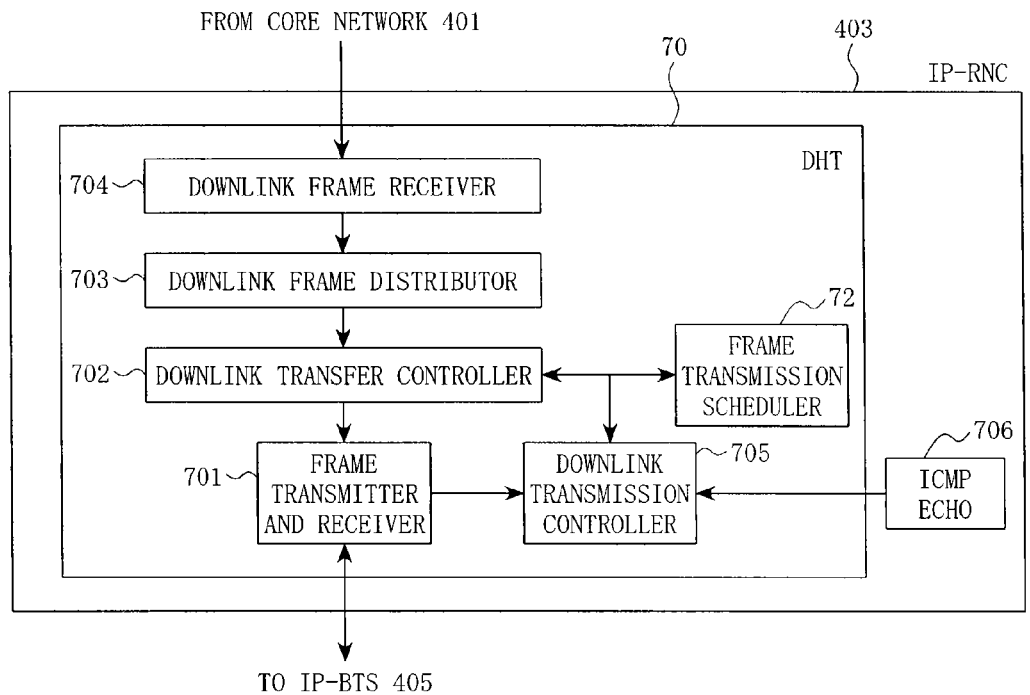
FIG. 7 is a block diagram illustrative of another configuration example of the IP-RNC in FIG. 1.

By use of ICMP (Internet Control Message Protocol) ECHO, the round-trip transmission delay of a frame between the radio network controller and the base transceiver station is measured regularly, so that the first period is determined based upon the measured value. ICMP is specified in RFC 792 and RFC 1885, which are the Internet Technical Specifications. Specifically, referring to FIG. 7, there is provided an ICMP ECHO request transmitter 706, which measures the round-trip transmission delay based upon the period from the time when the frame is transmitted to the IP-BTS 405 to the time when its response is received, so as to determine the first period. In the case of FIG. 7, the round-trip transmission delay of a frame is measured based upon the period from the time when the radio network controller transmits an ICMP ECHO request to the base transceiver station to the time when it receives its response. However, in a converse manner, the round-trip transmission delay of a frame may be measured based upon the period from the time when the base transceiver station transmits the ICMP ECHO request to the radio network controller to the time when the base transceiver station receives its response. That is to say, the round-trip transmission delay of a frame may be measured based upon the period from the time when any one of the radio network controller and the base transceiver station transmits the ICMP ECHO request to the other of them to the time when the afore-mentioned any one of the radio network controller and the base transceiver station receives its response. Incidentally, in a case where the base transceiver station transmits the ICMP ECHO request to the radio network controller, the measured result has to be informed from the base transceiver station to the radio network device controller.

(Calculation by Use of Stored Transmission Time and Reception Time)

Figure 8:
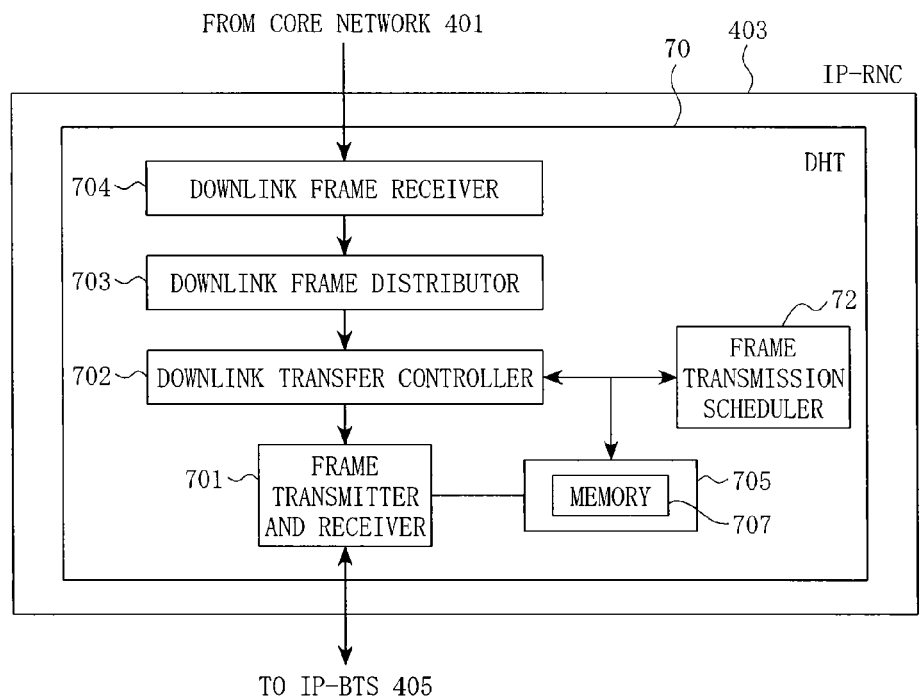
FIG. 8 is a block diagram illustrative of further another configuration example of the IP-RNC in FIG. 1.

Transmission times and reception times of a given number of the frames are stored. For example, they are stored in a memory 707 in the downlink transmission controller 705, as illustrated in FIG. 8. The first period is determined based upon the temporal difference between the stored transmission time and reception time.

(Calculation by Use of Transmission Schedule)

Figure 9:
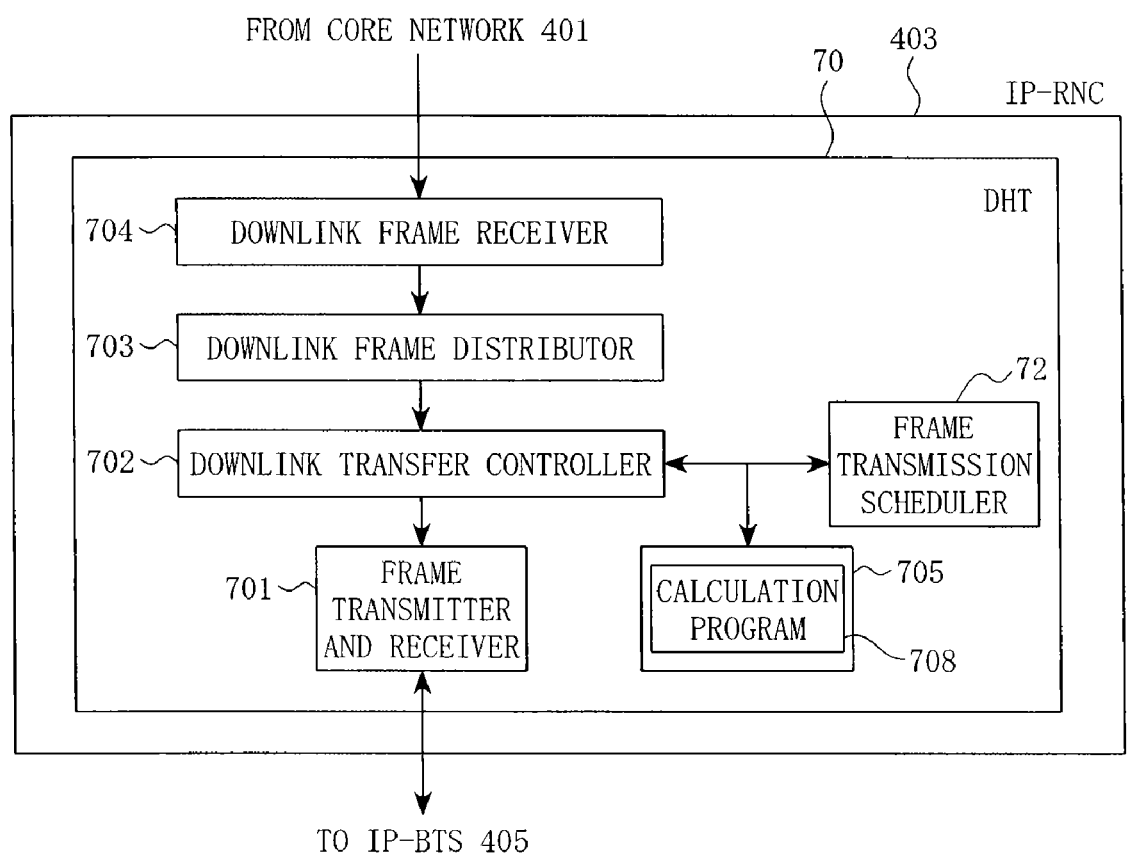
FIG. 9 is a block diagram illustrative of yet another configuration example of the IP-RNC in FIG. 1.

Additionally, the transmission time of the received frame can be calculated by tracing back the transmission timing in the frame transmission schedule. In this case, for example, as illustrated in FIG. 9, a calculation program 708 is provided in the downlink transmission controller 705 to determine the first period based upon the temporal difference with the reception time. Such a configuration eliminates the need for providing a memory, unlike the configuration of FIG. 8.

(Setting at the Time of Communication Start)

Figure 10:
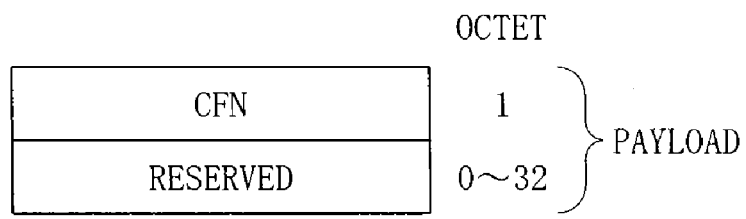
FIG. 10 is a view illustrative of a configuration of a DL Synchronisation frame.
Figure 11:
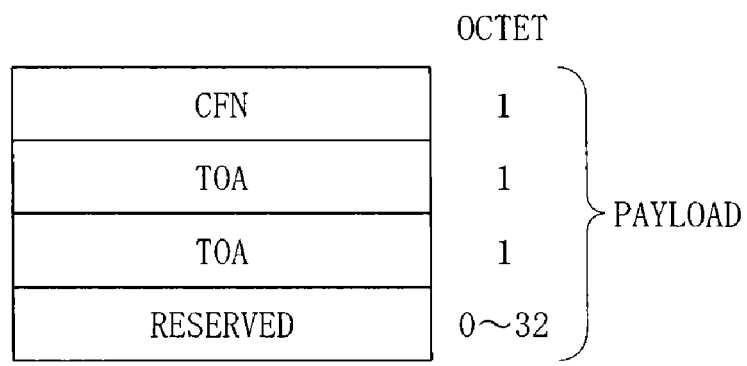
FIG. 11 is a view illustrative of a configuration of a UL Synchronisation frame.

Before a communication begins, the first period may be set according to the Transport Channel Synchronisation, which is a method of establishing synchronisation between the radio network controller and the base transceiver station. This method utilizes the DL Synchronisation frame and UL synchronisation frame specified in Chapter 7 (in particular, in Section 7.2) of 3GPP TS 25.402. Referring to FIG. 10, a DL Synchronisation frame has a payload part including a CFN of 1 octet and a reserved part of 0 to 32 octets. Meanwhile, a UL Synchronisation frame has a payload part including a CFN of 1 octet, a TOA of 2 octets, and a reserved part of 0 to 32 octets, as illustrated in FIG. 11.

The method will be described as follows in a specific manner. Firstly, a DL Synchronisation frame (applied with a CFN) is transmitted from the IP-RNC to the IP-BTS. Then, the IP-BTS that has received the DL Synchronisation frame immediately applies the period of time while the reception timing is being out of the Receiving Window (that is TOA) to a UL Synchronisation frame (applied with a CFN), and then informs the IP-RNC of it.

In this process, FIG. 12A illustrates a case where the reception timing of the DL Synchronisation frame falls within the Receiving window. FIG. 12B illustrates a case where the reception timing of the DL Synchronisation frame is out of the Receiving window. In any case, the UL Synchronisation frame (applied with a CFN) to which the TOA is applied is informed from the IP-BTS to the IP-RNC.

The IP-RNC that has received the UL Synchronisation frame determines the transmission timing based upon the value of the TOA. The Transport Channel Synchronisation is enabled by the round-trip transmission of the DL Synchronisation and the UL Synchronisation, in this manner. Accordingly, the round-trip transmission delay is measured, thereby allowing the first period to be determined when the communication begins. Incidentally, the DL Synchronisation and the UL Synchronisation are also specified in Section 5.3 of 3GPP TS 25.427.

(Frame Transmission Timing Adjusting Method)

Figure 13:
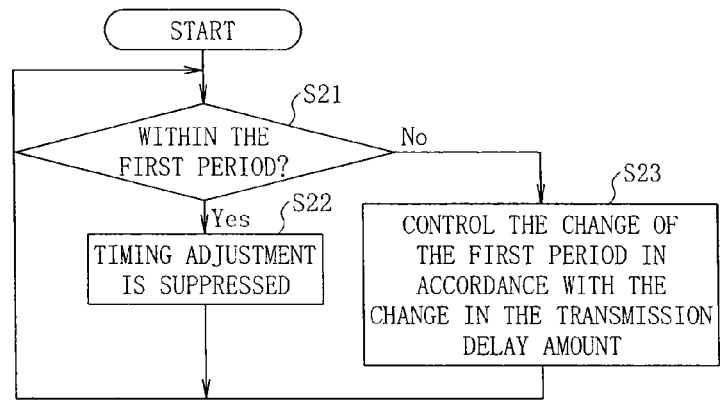
FIG. 13 is a flowchart illustrative of a frame transmission timing adjusting method according to an aspect of the present invention.
Figure 14:
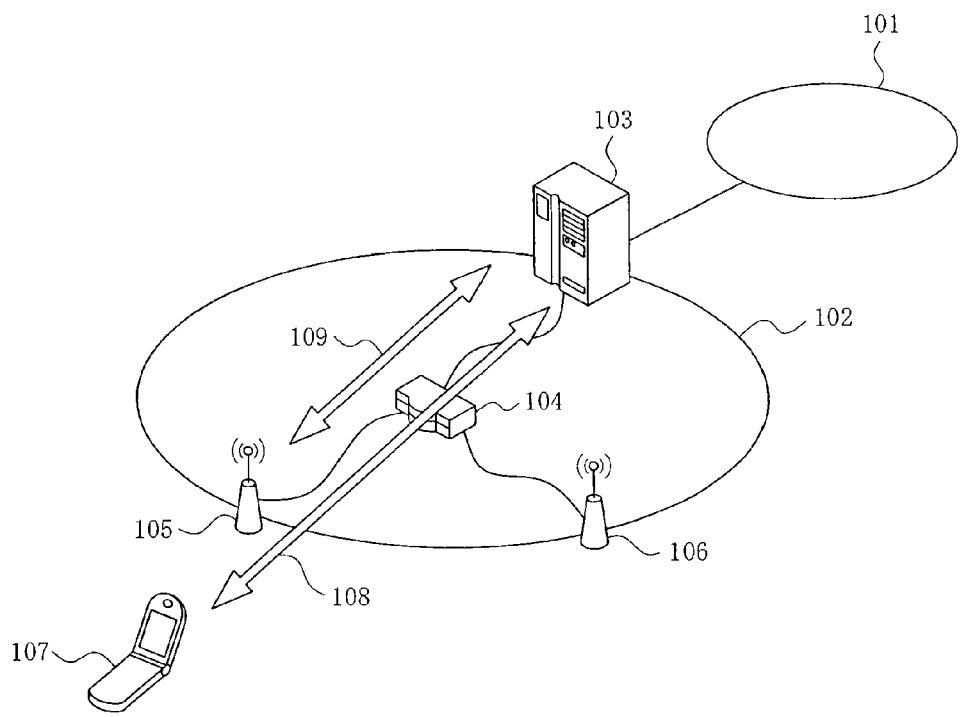
FIG. 14 is a view showing a configuration of a radio access network on the basis of IP technology of a mobile communication system by use of IMT 2000 system.
Figure 15:
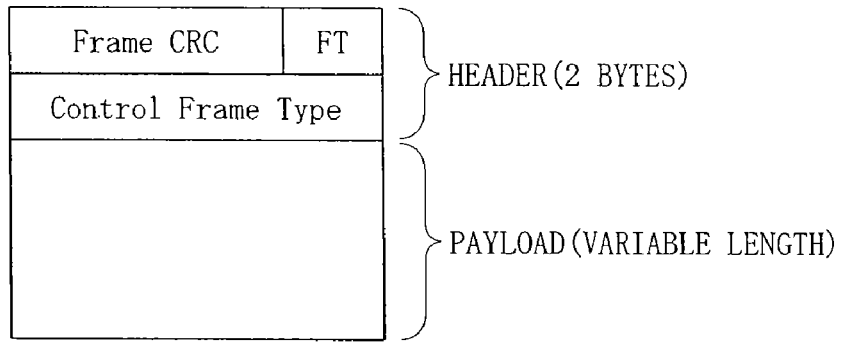
FIG. 15 is a view showing a configuration of a data frame.
Figure 16:
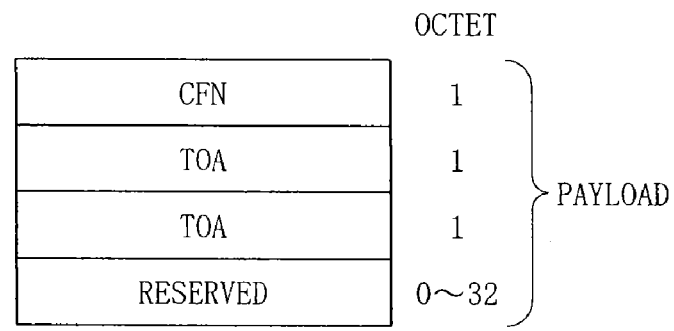
FIG. 16 is a view showing a configuration of a Timing Adjustment control frame.

In the mobile communication system as described heretofore, the following frame transmission timing adjusting method is achieved. That is, there is provided a frame transmission timing adjusting method of adjusting transmission timings of frames to be sequentially transmitted from the radio network controller to the base transceiver station, by transmitting a first control frame for informing of the difference with the reception timing to be expected, when the frame is received out of the receiving window, to the radio network controller from the base transceiver station with the receiving windows that are arranged at even intervals and that are temporal receiving range applied with frame sequence numbers, respectively, that increases its value as the time advances. As illustrated in FIG. 13, there are provided steps of: controlling adjustment of a transmission timing of a frame to be suspended in a first period that begins immediately after the transmission timing is adjusted, as a period of ignoring the first control frame that has been received; and changing of the first period in accordance with a change in a transmission delay between the radio network controller and the base transceiver station.

In other words, in FIG. 13, adjustment of a frame transmission timing is suspended in the first period (step S21 to step S22). The first period is controlled to be changed in accordance with a change in the delayed amount in transmission, out of the first period (step S21 to step S23). When such a method is employed, the synchronisation control is achieved with certainty by providing a period of ignoring the first control frame informed from the radio base transceiver station to the radio network controller and setting the period to be a variable value.

(Conclusion)

In the conventional radio network controller, the first period is a predetermined fixed value. In a case where the first period is a fixed value, if a round-trip transmission delay between the radio network controller and the base transceiver station is short, there is a drawback that the response to the synchronisation control is delayed more than necessary.

In addition, if a round-trip transmission delay between the radio network controller and the base transceiver station is long, there is a drawback that the synchronisation control does not work.

In contrast, according to the present invention, the first period (Timing Adjustment Guard Time) is set to be a variable value, instead of a fixed value, so as to be set the first period in an appropriate manner. It is therefore possible to address the above drawbacks. In other words, when the Timing Adjustment control frame, which is a first control frame, is received, the Iub data frame transmission timing is changeable immediately and without waste.

INDUSTRIAL APPLICABILITY

The present invention is applicable to synchronisation control between a radio network controller and a base transceiver station in a mobile communication system by use of the IMT 2000 system.

The invention claimed is:

1. A radio network controller, comprising:
a transmission timing adjusting unit for adjusting transmission timings of downlink frames to be sequentially transmitted from the radio network controller to a base transceiver station having a receiving window, after receiving from the base transceiver station a first timing adjustment control frame for informing of a difference between a reception timing of a downlink frame applied with a frame sequence number and an expected reception timing of the downlink frame to be received by the base transceiver station, when the downlink frame is received outside of the receiving window by the base transceiver station;
a control unit for controlling a transmission schedule of the downlink frame not to change, even if another timing adjustment control frame is received in a first period that begins immediately after the transmission timing is adjusted, as a period of ignoring the timing adjustment control frame that has been received; and
a changing unit for changing the first period in accordance with a change in a transmission delay between the radio network controller and the base transceiver station;
wherein the first period is set to a period $\alpha$ plus a round-trip time, the period $\alpha$ being greater than 0 and smaller than a transmission interval of the downlink frames, the round-trip time being a period from a time when the downlink frame is transmitted to the base transceiver station from the radio network controller to a time when the radio network controller receives the timing adjustment control frame in response to the downlink frame.

2. The radio network controller according to claim 1, wherein the round-trip time is set based upon a period from a time when any one of the radio network controller and the base transceiver station transmits an ICMP ECHO request to a time when said any one of the radio network controller and the base transceiver station receives a response of the ICMP ECHO request.

3. The radio network controller according to claim 1, wherein the round-trip time is set based upon a temporal difference between a transmission time of a DL Synchronisation frame, and a reception time of a UL Synchronization frame, the DL Synchronization frame and the UL Synchronization frame being transmitted and received between the radio network controller and the base transceiver station, in Transport Channel Synchronisation specified in 3GPP TS 25.402.

4. A frame transmission timing adjusting method comprising the steps of:

adjusting transmission timings of downlink frames to be sequentially transmitted from a radio network controller to a base transceiver station having a receiving window, after receiving from the base transceiver station a timing adjustment control frame for informing of a difference between a reception timing of a downlink frame applied with a frame sequence number and an expected reception timing of the downlink frame to be received by the base transceiver station, when the downlink frame is received outside of the receiving window by the base transceiver station;

controlling a transmission schedule of the downlink frame not to change, even if another timing adjustment control frame is received in a first period that begins immediately after the transmission timing is adjusted, as a period of ignoring the timing adjustment control frame that has been received; and changing of the first period in accordance with a change in a transmission delay between the radio network controller and the base transceiver station;

wherein the first period is set to a period $\alpha$ plus a round-trip time, the period $\alpha$ being greater than 0 and smaller than a transmission interval of the downlink frames, the round-trip time being a period from a time when the downlink frame is transmitted to the base transceiver station from the radio network controller to a time when the radio network controller receives the timing adjustment control frame in response to the downlink frame.

* * * * *